July 26, 1932.　　　D. B. TOLLEY　　　1,868,957
FEEDER FOR CHICKS AND OLDER FOWLS
Filed July 3, 1930　　2 Sheets-Sheet 1
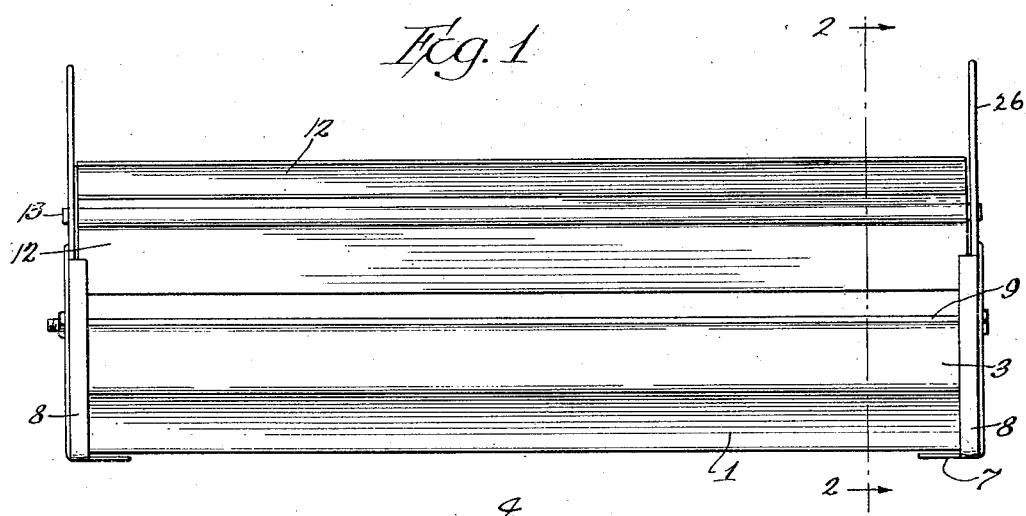
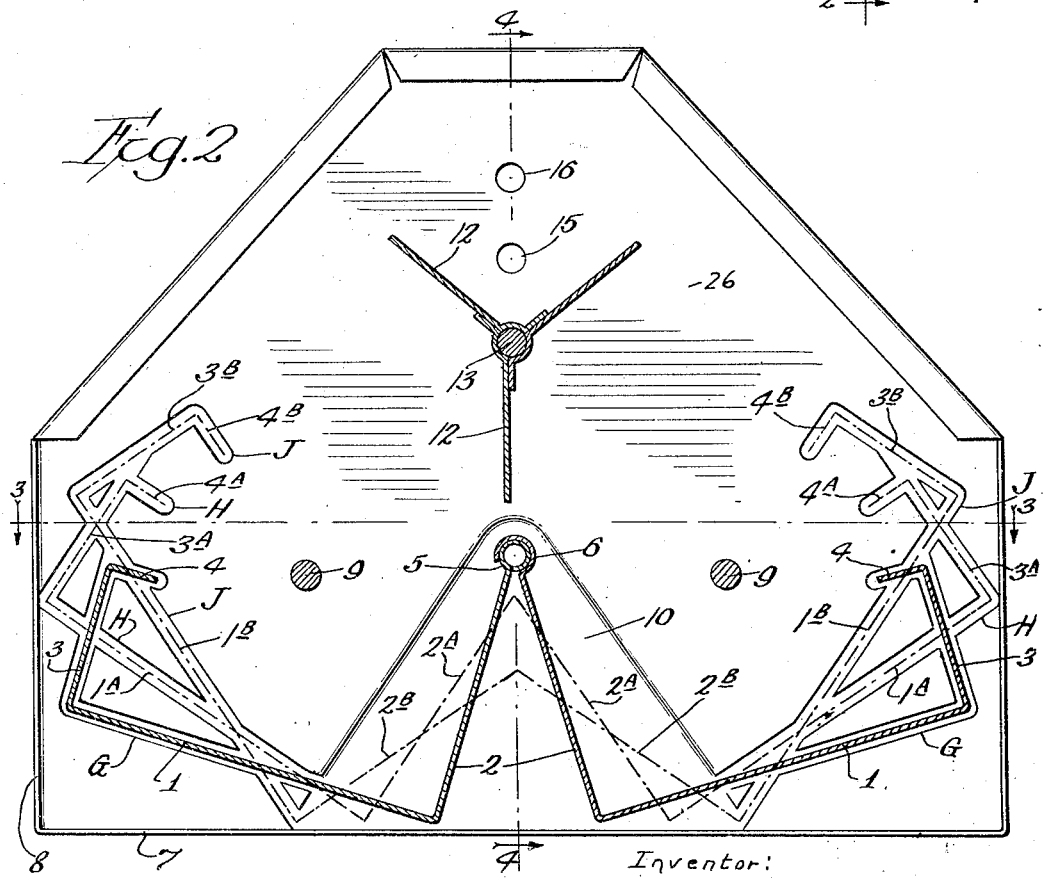
Inventor:
Donald B. Tolley
by Albert Scheible
Attorney

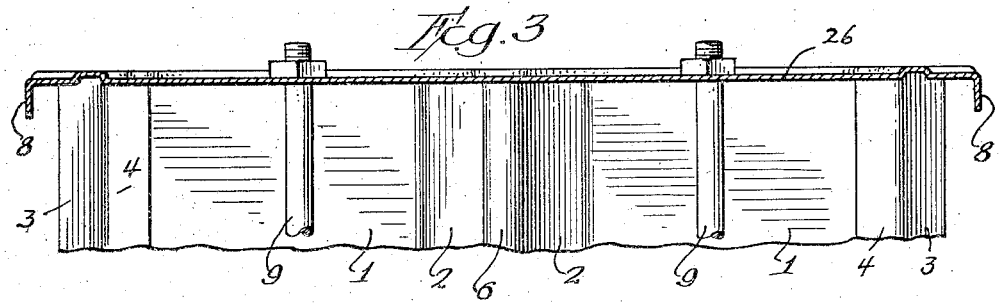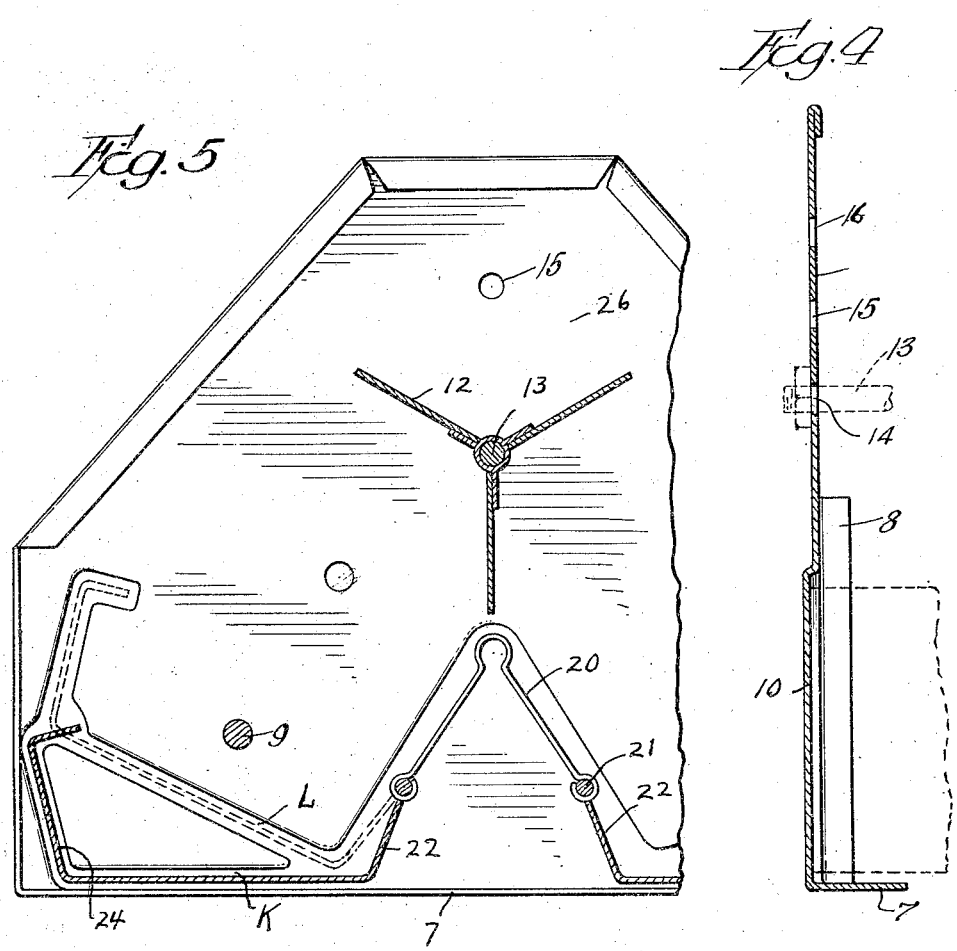

Patented July 26, 1932

1,868,957

UNITED STATES PATENT OFFICE

DONALD B. TOLLEY, OF MACOMB, ILLINOIS, ASSIGNOR TO GLOBE AMERICAN CORPORATION, OF KOKOMO, INDIANA, A CORPORATION OF INDIANA

FEEDER FOR CHICKS AND OLDER FOWLS

Application filed July 3, 1930. Serial No. 465,632.

My invention relates to poultry feeders, and in its general objects includes the providing of an inexpensive, sanitary poultry feeder which can readily be adjusted as to the effective height of its feed trough and guard portions to suit the size of the chickens as these grow. Furthermore, my invention aims to provide an adjustable feeder of this class which will be sanitary and easily cleaned, which in all of its adjusted positions will prevent the feed from being tossed over the outer trough edges, and which will be effectively guarded in each of its adjusted positions to prevent chickens from entering it and from roosting on it.

In some of its more particular aspects, my invention aims to provide a feeder including a twin trough arrangement which will readily permit the two troughs to be adjusted for varying the heights of the outer trough walls without requiring the troughs to be raised bodily, and which will enable the troughs to be held rigidly in a plurality of adjusted positions without requiring auxiliary adjusting members.

Moreover, my invention aims to provide a feeder of this class in which a roose-preventing guard (such as a so called "tumble bar") can readily be adjusted in height to correspond to the adjusted positions of the troughs, and in which exceedingly few fastening elements will be required for securing the feeder parts to each other. Furthermore, my invention aims to provide a feeder of this class which will require no base plate, and which will hold nearly all parts of the feeder above dirt and litter on the floor.

Still further and also more detailed objects will appear from the following specification, and from the accompanying drawings, in which Fig. 1 is a side elevation of an adjustable poultry feeder embodying my invention, showing the same as adjusted for use with baby chicks.

Fig. 2 is an enlarged transverse vertical section, taken along the line 2—2 of Fig. 1, with dotted lines indicating two other positions of the feed troughs.

Fig. 3 is a fragmentary plan view of the same feeder, drawn on the same scale as Fig. 2.

Fig. 4 is a central and vertical section through one of the end members of this feeder, taken along the line 4—4 of Fig. 2, with dotted lines indicating the positions of some adjacent feeder parts.

Fig. 5 is a section, similar to a portion of Fig. 2, showing another embodiment of my invention, namely one in which the twin trough member comprises three interpivoted parts and in which the end members are formed for positively holding the outer trough walls at only two relatively different effective heights.

In the embodiment of Figs. 1 to 4 inclusive, my adjustable feeder includes two open-ended feed troughs extending side by side and having the upper ends of their inner trough walls connected to each other, two footed end members between which the two troughs are clamped and which end members effectively close the ends of the troughs, and bolts which extend lontgitudinally of the troughs through the two end members to effect the said clamping and to guard against the entry of the troughs by the chickens.

To accomplish the important object of permitting the outer walls of the troughs to be raised from their lowermost positions without bodily raising the entire troughs, I preferably pivot the upper ends of the inner walls of the troughs to each other. And to avoid—or at least greatly deter—having some of the feed splashed or tossed over the outer trough walls, I preferably provide each of these outer trough walls with an inwardly directed guard ledge.

Thus, Fig. 2 shows each trough as including a trough bottom 1, an inner wall 2, an outer wall 3 and a guard ledge 4 extending from the upper end of the outer wall toward the inner wall. The upper end of one of the inner trough walls 2 is curled into a tube 5; and the upper end portion 6 of the inner wall of the other trough is curled partly around the said tube, thereby pivoting these two inner trough walls to each other on an axis longitudinal of both troughs.

Thus connected, the two troughs (which together constitute a twin trough member, bodily detachable from the two end members) can be rocked about the axis of the said tubular formations 5 and 6, so as to dispose the troughs in positions in which each trough bottom 1 slopes upward toward the adjacent side of the feeder at varying angles, thereby correspondingly raising or lowering the outer wall 3 of each trough even when the lowermost portions of the troughs remain at the same level.

For example, dotted lines in Fig. 2 indicate the section of each trough when in a position in which the inner trough walls (designated as 2A) diverge at greater angles from each other, the trough bottoms (1A) slope upward at greater angles, and the upper ends of the outer trough walls (3A) as well as the guard ledge 4A are disposed considerably higher than the positions of the corresponding trough parts in the lowermost position heretofore described as corresponding to those of the trough as shown (sectioned) in full lines in the same figure.

Likewise, the numerals 1B, 2B, 3B and 4B respectively refer to lines respectively showing the positions of the same trough parts when the troughs are swung still further about their said interpivoting, so as to dispose the upper ends of the outer trough walls at still greater elevations.

To support the twin troughs, I provide two end members, each of which bears against the ends of both troughs so as to afford the needed end closures for the troughs. Each of these end members includes a generally flat end plate 26, provided at its lower end with a foot 7 in the form of a horizontal flange extending toward the other end member, and this end plate is desirably stiffened by narrow vertical flanges 8 extending from each lateral edge of the end plate toward the other end member. These two end members are drawn toward each other (to clamp the troughs between them) by releasable clamping means, desirably consisting of bolts 9 which extend through both end members respectively above the bottoms of the two troughs, and which bolts preferably extend parallel to the troughs and at right angles to the end plates 6.

With the trough ends at right angles to the longitudinal axes of the troughs, these troughs could readily be clamped rigidly between the two end members without requiring any auxiliary provisions to prevent the troughs from sliding or shifting with respect to the end plates. However, I preferably provide each end member with formations which will positively prevent any shifting of the troughs with respect to the end members, and which formations will also define trough positions respectively suitable for chicks of certain approximate sizes.

For this purpose, I desirably emboss grooves G, H and J in each of the end members, which grooves in each end member open inwardly of the feeder and are shaped for receiving portions of the trough ends when the troughs are disposed in positions suitable for chickens of certain heights. The grooves thus provided in each end member of my feeder include portions respectively entered by at least a part of an adjacent end portion of the trough bottom, and by the entire ends of the outer trough wall and of the guard flange on this outer trough wall.

When thus provided, it will be obvious from Fig. 2 that the several portions of the groove G will respectively prevent movements of the trough bottom 1, the outer trough wall 3 and the guard flange 4. Since this three-fold interlocking of the feeder end with each trough will prevent the trough from moving either upwardly, laterally or rotationally, and since the inner trough walls 2 are pivoted to each other at their upper edges, no position-defining grooves are needed in association with the ends of the inner trough walls, so that a flat and wide embossed portion 10 suffices for receiving the ends of these inner trough walls 2.

It will also be obvious from Fig. 2 that the grooves H will receive and positively hold the end portions of the trough parts 1A, 3A and 4A when the troughs are at an intermediate effective height, and that the grooves J will effectively latch trough end parts when the troughs are in the still more elevated positions designated by 1B, 3B and 4B. Consequently, these simple formations afford positive means for retaining the troughs in certain adjusted positions, and by suitably arranging the several grooves, I make it easy for an inexperienced user to adjust my feeder to certain definite effective heights.

To prevent chickens from bodily entering the feed troughs and also to prevent large chickens from roosting on the juncture of the two troughs, I desirably also provide roost-preventing means in the form of a rotary member supported above the said trough juncture. Figs. 1 and 2 show this in the form of a socalled "tumble guard" consisting of three diverging vanes 12 which are secured to each other and to a pivot pin 13, which pin extends through and is journaled in alined perforations 14 in the two end plates. These perforations 14 are disposed so that the vanes 12 will freely clear the troughs when these are in the generally lowered positions in which the inner trough walls 2 are highest.

When the troughs are in the other positions defined by the grooves, the pivot pin 13 is shifted to the corresponding one of other end plate perforations 15 and 16, each of which suitably disposes the tumble guard for an effective position while leaving ample room for permitting the troughs to be reached by the larger chickens for which the troughs are then adjusted.

With the three-position feeder above described, it will be obvious from Fig. 2 that the guard ledge 4 on each trough will prevent mash (or other feed) in the trough from being tossed out or splashed over the outer edge of the trough by the feeding chickens, this being true with each of the trough positions defined by the grooves in the end members.

It will also be evident from the same figure, that by making the inner wall 2 of each trough considerably higher than the outer wall 3, and by interconnecting the inner trough walls at their upper ends to avoid any gap between them, I permit the feed-holding capacity of the twin trough member to increase automatically as the troughs are adjusted from their lowest to their highest effective positions. That is to say, in full line position of Fig. 2, the feed might come up to the bottom of the clamping bolt 9, while in the most raised dotted position, the feed might extend above the clamping bolt and above the juncture of the two troughs.

Moreover, by disposing each of the clamping bolts 9 at the mouth of one trough when this trough is in a lowered position suitable for small chicks, I cause this clamping bolt also to serve as a guard to prevent chicks from hopping into the trough.

In practice, I desirably form the two troughs so that each trough bottom slopes upwards laterally outward of the feeder. By doing this, I can hold almost all parts of each trough at a considerable spacing from the floor even when the juncture of the trough bottom with the inner trough wall is close to the floor, and hence reduce the littering of the feeder by whatever is on the floor.

Moreover, since the feeder can easily be assembled and disassembled, it can advantageously be shipped "knock-down" in a carton only slightly taller than the height of the inner trough walls, as the two end members can be packed under the trough member.

However, while I have heretofore described my poultry feeder in an embodiment in which the trough member comprises only two hingedly connected parts, and in which formations on the end members define three different positions for each trough, I do not wish to be limited either to these or other details of the construction and arrangement thus disclosed, since many changes could obviously be made without departing either from the spirit of my invention or from the appended claims.

For example, Fig. 5 shows portions of another embodiment of my invention, in which the trough member comprises a central ridge member 20 of inverted V-shaped cross-section, and in which each trough has the upper end 21 of its inner wall 22 pivoted to the lower end of one web of this ridge member. This figure also shows troughs of somewhat different cross-sectional shape, namely with obtuse angles between the trough bottom 23 and the two riser walls (22 and 24) of the trough. It also shows a latching groove K in the trough end plate 26 disposed so as to extend horizontally adjacent to the foot 7 on the end plate, and only one other groove L for holding the trough in a more elevated position.

I claim as my invention:

1. A poultry feeder comprising two parallel and adjacent troughs of equal length open at both ends and connected to each other at the upper edges of their adjacent trough sides, two risers respectively adjacent to the opposite ends of the troughs; and two bolts spanning the risers and clamping the troughs between the risers, each bolt being disposed so as to prevent chicks from bodily entering one of the troughs, and so as to reduce the wasteful billing of food out of the feeder.

2. A poultry feeder comprising two parallel and adjacent troughs of equal length open at both ends and hingedly connected to each other at their adjacent trough sides, two risers respectively adjacent to the opposite ends of the troughs, and clamping means operatively connecting the two risers to clamp the troughs between the risers, each riser having grooves spaced from the hinged interconnecting of the troughs and disposed for engagement by the troughs to prevent movements of the troughs with respect to the risers in planes parallel to the faces of the risers.

3. A poultry feeder comprising two parallel and adjacent troughs of equal length hingedly connected to each other at the upper edges of their adjacent trough sides, two risers respectively adjacent to the opposite ends of the troughs, and means operatively connecting the two risers to clamp the troughs between the risers; the troughs being open at both ends and the risers forming closures for the trough ends, and the risers having portions respectively disposed for effectively hooking over portions of the trough ends when the troughs are in any one of a plurality of positions with respect to each other and to the risers.

4. A poultry feeder comprising two parallel and adjacent troughs of equal length open at each end and connected to each other at the upper edges of their adjacent trough sides, two risers supporting both troughs and respectively closing the opposite ends of the troughs, and means operatively connecting the two risers to clamp the troughs between the risers; each riser having grooves opening toward the other riser, the said grooves being arranged in groups each of which comprises a set of grooves respectively disposed for receiving end portions of both troughs in different positions in which the two troughs have the upper edges of their outer trough sides at consecutively greater distances from the lower ends of the risers and in which the mouths of the two troughs are at consecutively smaller angles with respect to each other.

Signed at Macomb, Illinois, June 30th, 1930.

DONALD B. TOLLEY.